(12) United States Patent
Addison et al.

(10) Patent No.: US 11,328,572 B2
(45) Date of Patent: May 10, 2022

(54) AI-BASED VIDEO TAGGING FOR ALARM MANAGEMENT

(71) Applicant: Covidien LP, Mansfield, MA (US)

(72) Inventors: Paul S. Addison, Edinburgh (GB);
Dean Montgomery, Edinburgh (GB);
André Antunes, Edinburgh (GB)

(73) Assignee: Covidien LP, Mansfield, MA (US)

( * ) Notice: Subject to any disclaimer, the term of this patent is extended or adjusted under 35 U.S.C. 154(b) by 205 days.

(21) Appl. No.: 16/854,059

(22) Filed: Apr. 21, 2020

(65) Prior Publication Data

US 2021/0327245 A1 Oct. 21, 2021

(51) Int. Cl.
*G08B 21/04* (2006.01)
*G08B 21/18* (2006.01)
*H04N 7/18* (2006.01)
*G06N 20/00* (2019.01)
*G06K 9/00* (2006.01)

(52) U.S. Cl.
CPC ..... *G08B 21/0453* (2013.01); *G06K 9/00771* (2013.01); *G06N 20/00* (2019.01); *G08B 21/182* (2013.01); *H04N 7/183* (2013.01)

(58) Field of Classification Search
CPC .. H01R 12/7076; H01R 12/88; H01R 43/205; H05K 3/32; H05K 7/1007
See application file for complete search history.

(56) References Cited

U.S. PATENT DOCUMENTS

| 8,648,900 | B2 * | 2/2014 | Vu | A61B 5/1106 348/64 |
| 10,757,366 | B1 * | 8/2020 | Kwatra | H04N 7/147 |
| 10,770,185 | B2 * | 9/2020 | Hayashi | G16H 50/50 |
| 2006/0049936 | A1 * | 3/2006 | Collins, Jr. | G08C 19/00 340/539.11 |
| 2007/0040692 | A1 * | 2/2007 | Smith | A61B 5/1115 340/573.1 |
| 2007/0157385 | A1 * | 7/2007 | Lemire | A61G 7/0509 5/600 |
| 2010/0225501 | A1 * | 9/2010 | Grubis | G08B 21/22 340/870.16 |
| 2013/0109965 | A1 * | 5/2013 | Assman | A61M 5/007 600/431 |
| 2015/0199892 | A1 * | 7/2015 | Johnson | G08B 21/0476 348/77 |
| 2017/0112504 | A1 * | 4/2017 | McEwen | A63B 21/4025 |
| 2018/0348759 | A1 * | 12/2018 | Freeman | G05D 1/0061 |
| 2019/0014982 | A1 * | 1/2019 | Bhuiyan | G06K 9/4604 |
| 2019/0231231 | A1 * | 8/2019 | Saria | A61B 5/1128 |

(Continued)

*Primary Examiner* — Joon Kwon
(74) *Attorney, Agent, or Firm* — Holzer Patel Drennan

(57) ABSTRACT

Implementations described herein discloses, a method of AI based video tagging for alarm management includes receiving, using a processor, a video stream, the video stream comprising a sequence of images for at least a portion of a patient, determining, using the processor, a physiological parameter for the patient based on the sequence of images, detecting, using machine learning, presence of a noise object and setting a interaction-flag to a positive value in response to detecting the noise object, comparing a quality level of the sequence of images with a threshold quality level, and modifying an alarm level based on the value of the interaction-flag and comparison of the quality level of the sequence of depth images with the threshold quality level.

20 Claims, 10 Drawing Sheets

(56) References Cited

U.S. PATENT DOCUMENTS

| | | | |
|---|---|---|---|
| 2020/0121186 A1* | 4/2020 | Collins, Jr. | G06F 8/65 |
| 2020/0329990 A1* | 10/2020 | Laszlo | A61B 5/7267 |
| 2021/0065885 A1* | 3/2021 | Receveur | G16H 40/67 |
| 2021/0158965 A1* | 5/2021 | Receveur | G16H 50/20 |
| 2021/0272696 A1* | 9/2021 | DeMazumder | G16H 40/63 |
| 2021/0364589 A1* | 11/2021 | Bilgic | A61B 5/7264 |

* cited by examiner

AI-BASED VIDEO TAGGING FOR ALARM MANAGEMENT

BACKGROUND

A range of depth sensing technologies are available to determine various physiological and contextual parameters, including respiration rate, tidal volume, minute volume, effort to breathe, activity, presence in bed, etc., that may be useful in detecting condition of a patient. Specifically, video (RGB) and depth-sensing cameras have enormous potential to provide non-contact methods for the determination of physiological parameters. However, many sources of noise exist which can cause erroneous values or an alarm to be triggered. For example, when a patient is assisted by clinicians, the clinicians hands entering the space around the patient may generate noise. Similarly, other objects, such as blankets, sleeping suits, etc., located on patient bed may also generate noise in the feed generated by the depth-sensing cameras.

SUMMARY

Implementations described herein discloses, a method of artificial intelligence (AI) based video tagging for alarm management includes receiving, using a processor, a video stream, the video stream comprising a sequence of images for at least a portion of a patient, determining, using the processor, a physiological parameter for the patient based on the sequence of images, detecting, using machine learning, presence of a noise object and setting a interaction-flag to a positive value in response to detecting the noise object, comparing a quality level of the sequence of images with a threshold quality level, and modifying an alarm level based on the value of the interaction-flag and comparison of the quality level of the sequence of depth images with the threshold quality level.

In an alternative implementation, the video stream further comprising at least one of a sequence of depth images and a sequence of RGB images. Alternatively, the physiological parameter for the patient further comprising determining the physiological parameter for the patient based on the sequence of images. Yet alternatively, detecting presence of a noise object further comprising detecting presence of a clinician intervention and setting the interaction-flag to a positive value in response to detecting the presence of a clinician intervention for a predetermined cool-off period. Alternatively, detecting presence of a noise object further comprising detecting a velocity of the noise object relative to the patient.

In one implementation, the method further includes comparing the velocity of the noise object to a range of velocities that are consistent with physical movement of an arm to determine presence of a caregiver's hand. Yet alternatively, modifying the alarm level further comprising delaying the alarm level in response to determining that the noise object is a caregiver's hand. Alternatively, detecting presence of a noise object further comprising adding a bounding box around an object in one or more of the sequence of images. Alternatively, the method further includes identifying the object in the bounding box using a multi-object classifier. Yet alternatively, the method further includes reporting the physiological parameter to a clinician if the quality level of the sequence of images is above the threshold quality level.

In a computing environment, a method performed at least in part on at least one processor, the method including receiving, using the processor, a video stream, the video stream comprising a sequence of images for at least a portion of a patient, determining a physiological parameter for the patient based on the sequence of images, detecting, using machine learning, presence of a noise object and setting a interaction-flag to a positive value in response to detecting the noise object, comparing a quality level of the sequence of images with a threshold quality level, reporting the physiological parameter to a clinician if the quality level of the sequence of images is above the threshold quality level and modifying an alarm level based on the value of the interaction-flag and comparison of the quality level of the sequence of depth images with the threshold quality level.

A physical article of manufacture including one or more tangible computer-readable storage media, encoding computer-executable instructions for executing on a computer system a computer process to provide an automated connection to a collaboration event for a computing device, the computer process including receiving a video stream, the video stream comprising a sequence of images for at least a portion of a patient, determining a physiological parameter for the patient based on the sequence of images, detecting, using machine learning, presence of a noise object and setting a interaction-flag to a positive value in response to detecting the noise object, comparing a quality level of the sequence of images with a threshold quality level, reporting the physiological parameter to a clinician if the quality level of the sequence of images is above the threshold quality level, and modifying an alarm level based on the value of the interaction-flag and comparison of the quality level of the sequence of depth images with the threshold quality level.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification.

DETAILED DESCRIPTIONS

Video-based monitoring is a new field of patient monitoring that uses a remote video camera to detect physical attributes of the patient. This type of monitoring may also be called "non-contact" monitoring in reference to the remote video sensor, which does not contact the patient. Specifically, video (RGB) and depth-sensing cameras have enormous potential to provide non-contact methods for the determination of physiological parameters. However, many sources of noise exist which can cause erroneous values or an alarm to be triggered. For example, when a patient is assisted by clinicians, the clinicians hands entering the space around the patient may generate noise. Similarly, other objects, such as blankets, sleeping suits, etc., located on patient bed may also generate noise in the feed generated by the depth-sensing cameras.

The technology disclosed herein provides for monitoring the video feed to determine the source of noise. Subsequently, if it is determined that the source of the noise is benign, such as a caretaker's hand, a blanket, etc., an alarm level may be adjusted. For example, the alarm level may be downgraded, delayed, or alarm may be muted based on the type of the detected object. The remainder of this disclosure offers methods for determination of contextual information that may be used as input to the alarm system.

Figure 1:
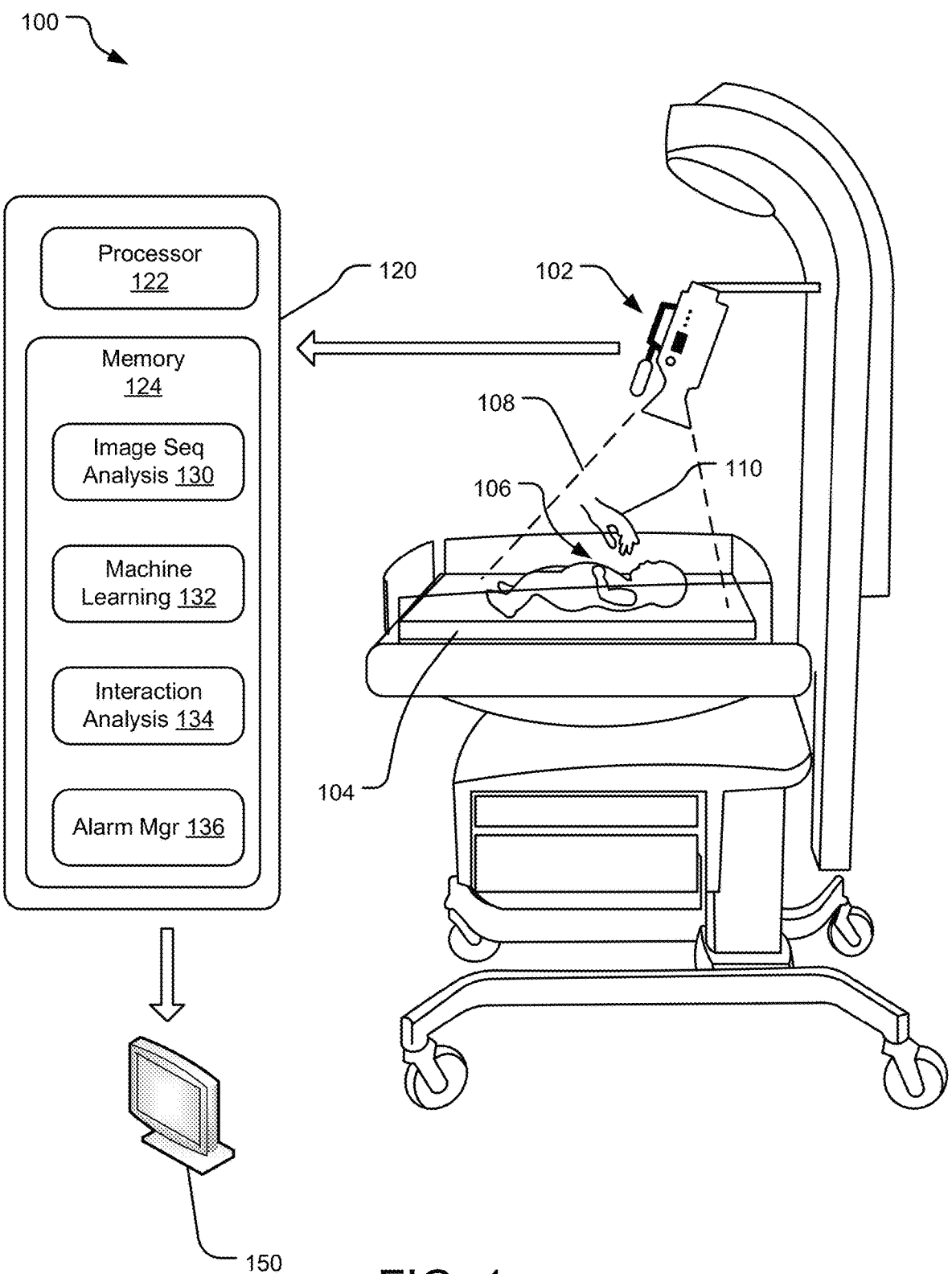
FIG. 1 illustrates an example schematic view of an AI based video tagging system for a patient as disclosed herein.

Specifically, a method disclosed herein allows generating a physiological signal using a depth sensing camera system. Such physiological signal may be a volume signal associated with the breathing of a patient. The physiological signal may be analyzed and the output of the analysis may be used to generate an alarm to a clinician. FIG. 1 illustrates an example schematic view of an AI based video tagging system 100 as disclosed herein that allows updating or modifying the alarm signal based on contextual information identified by the video feed. Specifically, the AI based video tagging system 100 may use a neural network that is trained to identify contextual information in the video feed.

The AI based video tagging system 100 includes a camera 102 that monitors a patient 106. For example, the patient 106 may be a neo-natal patient that is lying on bed 104 configured on a neo-natal patient caring system. The camera 102 is configured remote from the patient 106, in that it is spaced apart from and does not contact the patient 106. The camera 102 includes a detector exposed to a field of view 108 that encompasses at least a portion of the patient 106 and the bed 104.

The camera 102 may be depth-sensing camera that generates a sequence of images over time. A depth sensing camera can detect a distance between the camera and objects in its field of view and such information can be used to determine that the patient 106 is within the field of view 108 of the camera 102. Note that while FIG. 1 illustrates only one camera 102, in an alternative implementation, multiple cameras 102 may be used to generate multiple sequences of images. Furthermore, while the camera 102 is configured substantially vertically above the patient 106, in alternative implementations, the camera 102, or an additional camera, may be configured substantially on side of the patient 106. Furthermore, in an alternative implementation, the camera 102 may be an RGB camera that generates an RGB video stream.

Each of the sequence of images generated by the camera 102 includes the depth information within the field of view 108. The sequence of images generated by the camera 102 are communicated to a computing system 120 that analyzes the sequence of images to generate a series of physiological parameters about the patient 106. For example, such physiological parameter may be the volume signals associated with the breathing by the patient 106 that is generated by change in the depth of the chest and/or abdominal regions of the patient 106, as indicated by the sequence of images generated by the camera 102. The physiological parameters that are generated based on an RGB video stream may be patient heart rate, patient respiration rate, patient SpO2, etc. On the other hand, the physiological parameters that are generated based on an depth video stream may be patient respiration rate, patient tidal volume, patient minute volume, etc.

The computing system 120 may be a computing system that includes a microprocessor 122, a memory 124, and various other components. An example of such a computing system 120 is disclosed in FIG. 10 below. In a method disclosed herein, the memory 124 may be used to store the sequence of RGB or depth images generated by the camera 102. Furthermore, the memory 124 may also store one or more instructions of an image sequence analysis module 130 that can be executed using the micro-processor 122 to analyze the sequence of images generated by the camera 102 to derive physiological parameters associated with the breathing by the patient 106.

The AI based video tagging system 100 may also include a machine learning module 132 that may be trained to detect objects that may be causing interference in the video sequence collected from the camera 102. For example, a caregiver's hand 110 may cause such an interference. In one implementation, the machine learning module 132 may be trained to recognize presence of a patient in the bed 104 and various interfering objects, such as a hand, a blanket, etc. In one implementation, the machine learning module 132 may include a multi-object classifier that adds a bounding box around a recognized objects from the video stream.

An example of such a multi-object classifier is a you only look once (YoLo) real-object classifier. In one implementation, an off-the-shelf classifier may be trained to detect hands using transfer learning. Alternatively, a classifier may be trained from scratch to recognize caregiver hands. Yet alternatively, the machine learning module 132 may also be trained to differentiate an adult hand from a neonatal hand. Furthermore, the machine learning module 132 may be taught that hands attached to the neonate and/or mostly present in the video stream over time are not to be classified as caregiver hands. In one implementation, once bounding boxes is applied to hands that are consistently present in the video stream, such as the hands of the neonate, no interference is attributed to their movement. In other words, no interaction flag is generated as result of the movements of the hands identified as neonate's hands. Furthermore, the identification of a caregiver's hand and a patient's hand may also be used to detect interactions between caregivers and non-neonatal patients, e.g. adults.

The output of the machine learning module 132 may be input into an interaction analysis module 134 that is configured to set an interaction flag (i-flag) in response to determination of an object by the machine learning module 132. For example, the i-flag may be set to an "on" value to indicate presence of interference. The motion or obscuring of the field of view resulting from interaction by a caregiver with the patient 106 may lead to signal interference and therefore poor signal quality. Normally, such interference may lead to an alarm being triggered. Therefore, an alarm manager 136 analyzes the i-flag to adjust or modify the alarm set in response to the interference. Specifically, in one implementation, if the i-flag is set to indicate the presence of interference, then the alarm manager 136 may modify the alarm condition to one of: non alarm, delayed alarm, lower priority alarm, etc. The output of the alarm manager 136 may be displayed on or announced via a monitor or a display 150.

In an alternative implementation, the i-flag may remain set for a "cool down" period to mitigate false alarms in the immediate aftermath of a detected interference. Because the causes of the interference, may cause transient effects in the physiological signals, the cool down period allows reducing false or nuisance alarms that may be generated as a result of clinical interventions that generate that interferences.

Figure 2:
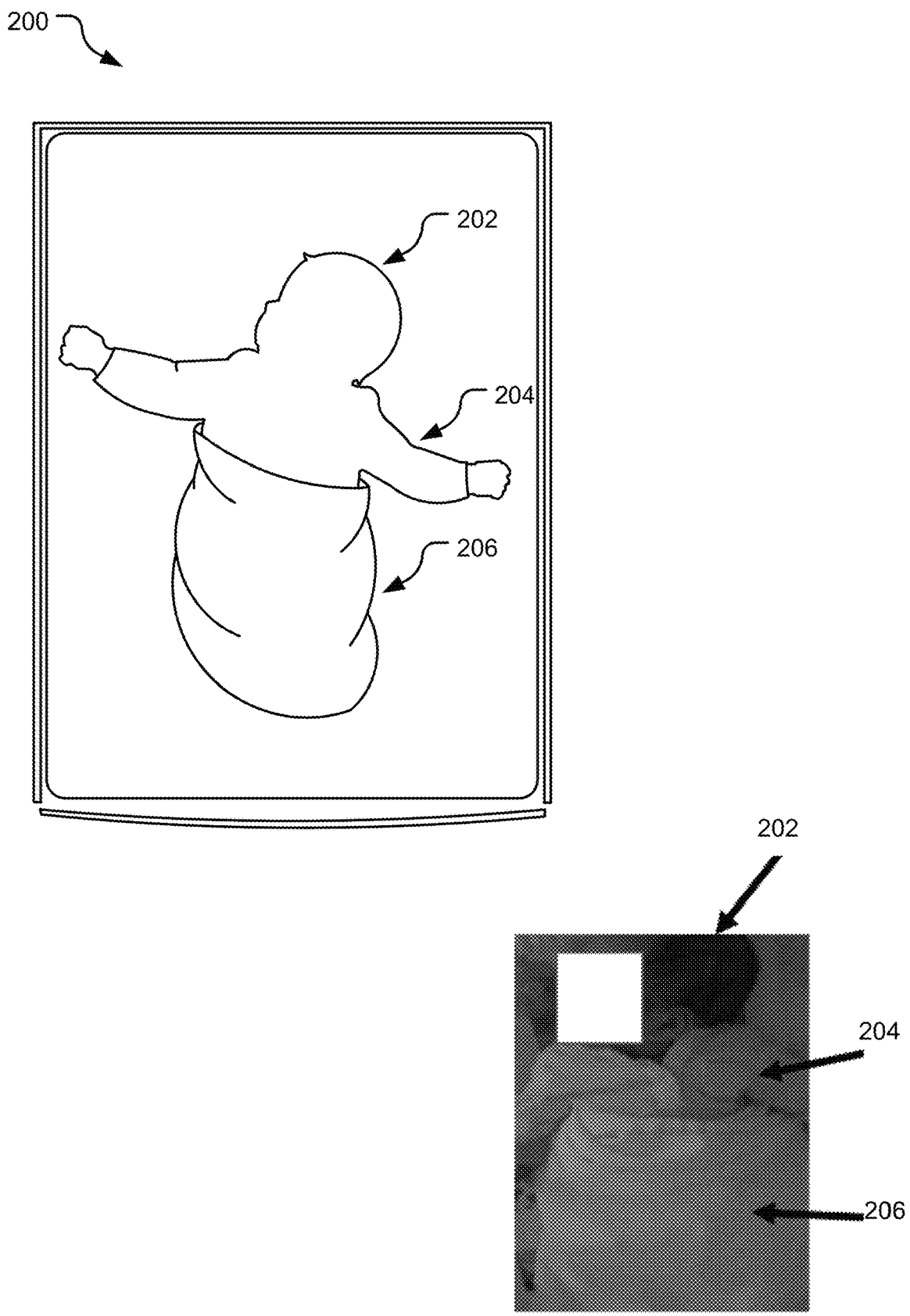
FIG. 2 illustrates an example image of a neonate patient generated by an RGB video stream.

FIG. 2 illustrates an image of a neonate patient 202 generated by an RGB video stream. The patient 202 is illustrated as wearing a sleep suit 204 and is shown wrapped in a blanket 206. In one implementation, machine learning is applied to the RGB stream to identify the baby suit 204 and the blanket 206. If there is any interaction by a caregiver or other person with the patient 202, such interaction may cause interference of various physiological signals generated based on the RGB stream and trigger an alarm.

Figure 3:
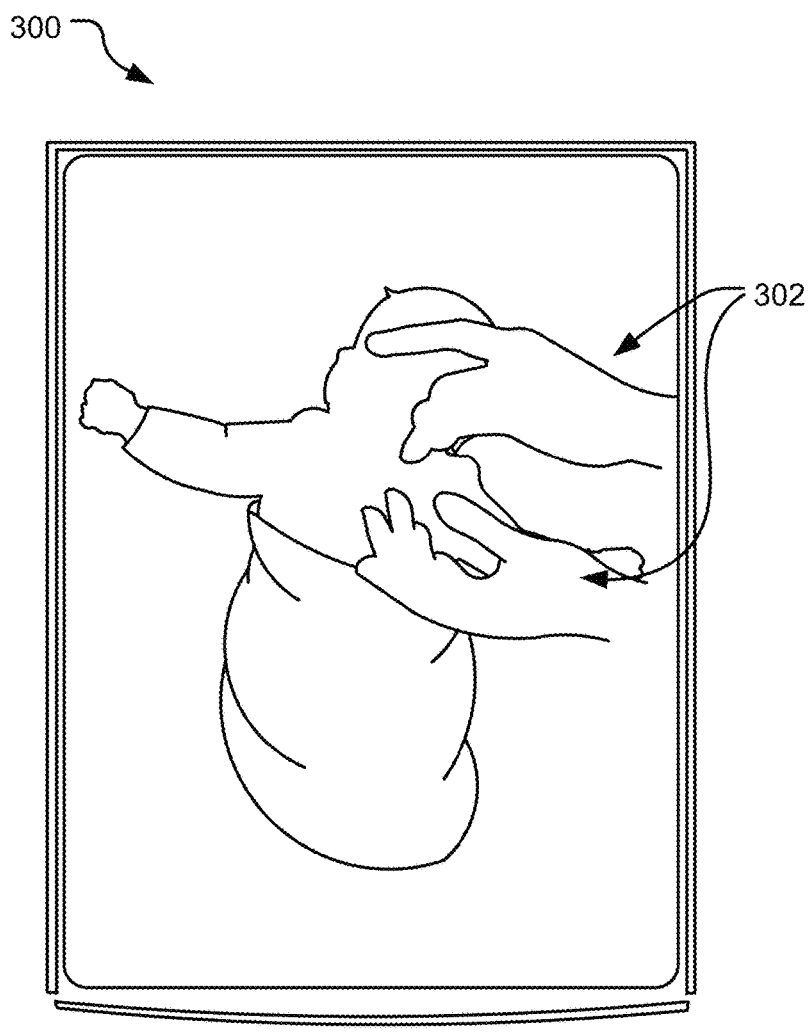
FIG. 3 illustrates an example of a caregiver's hands adjusting a patient's clothing generated by an RGB video stream.
Figure 3:
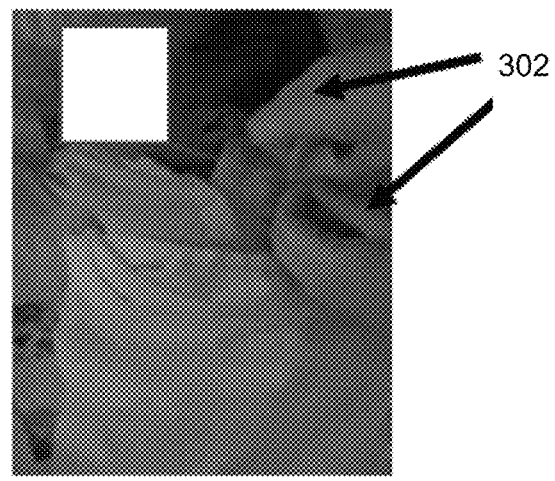

For example, FIG. 3 illustrates a caregiver's hands 302 adjusting a patient's clothing. When the RGB stream that includes the caregiver's hands 302 is used to generate any physiological signals, such as patient's heart rate, these physiological signals may result in generation of an alarm. In an implementation disclosed herein, machine learning methods may be used to identify presence of the caregiver's hands 302 in the video images.

Figure 4:
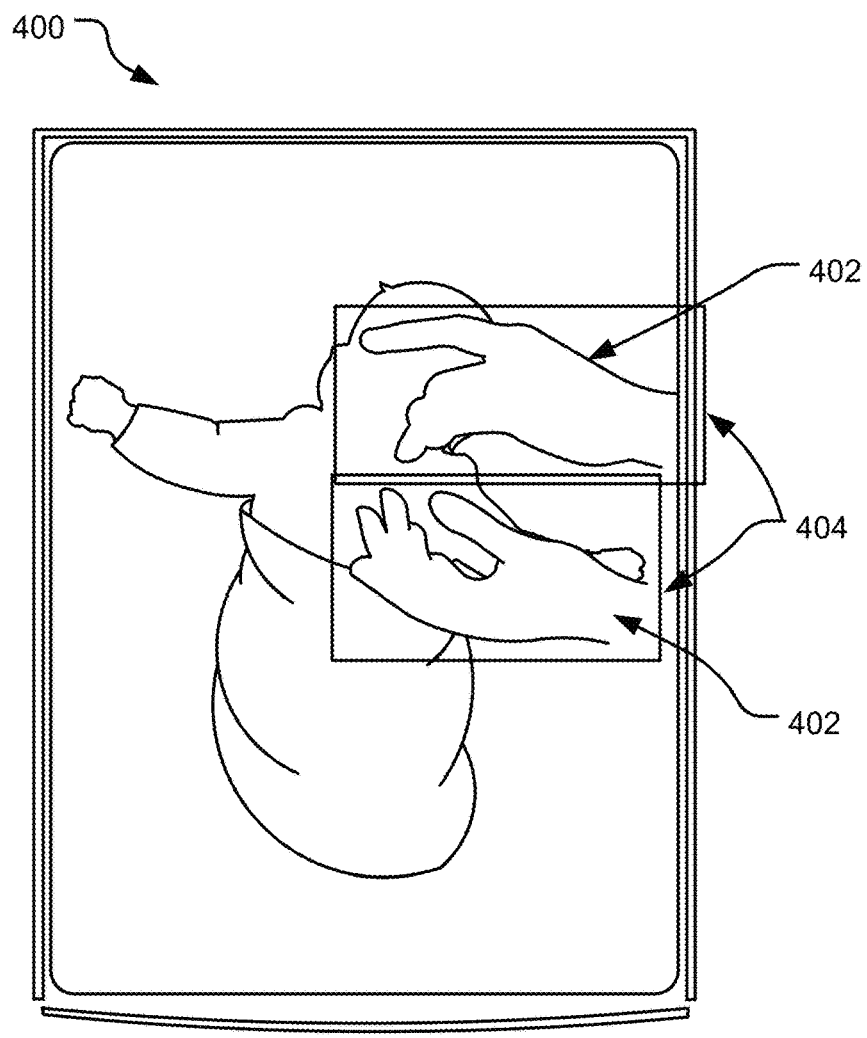
FIG. 4 illustrates example of detection of hands in an image using a machine learning method generated by an RGB video stream.
Figure 4:
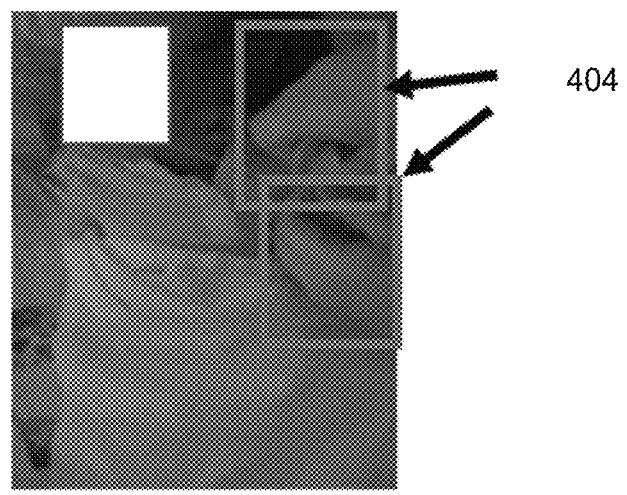

FIG. 4 illustrates detection of hands 402 in an image 400 using a machine learning method. A machine learning module, such as the machine learning module 132 disclosed in FIG. 1, places detection boxes 404 around the hands 402 to indicate their detection.

Figure 5:
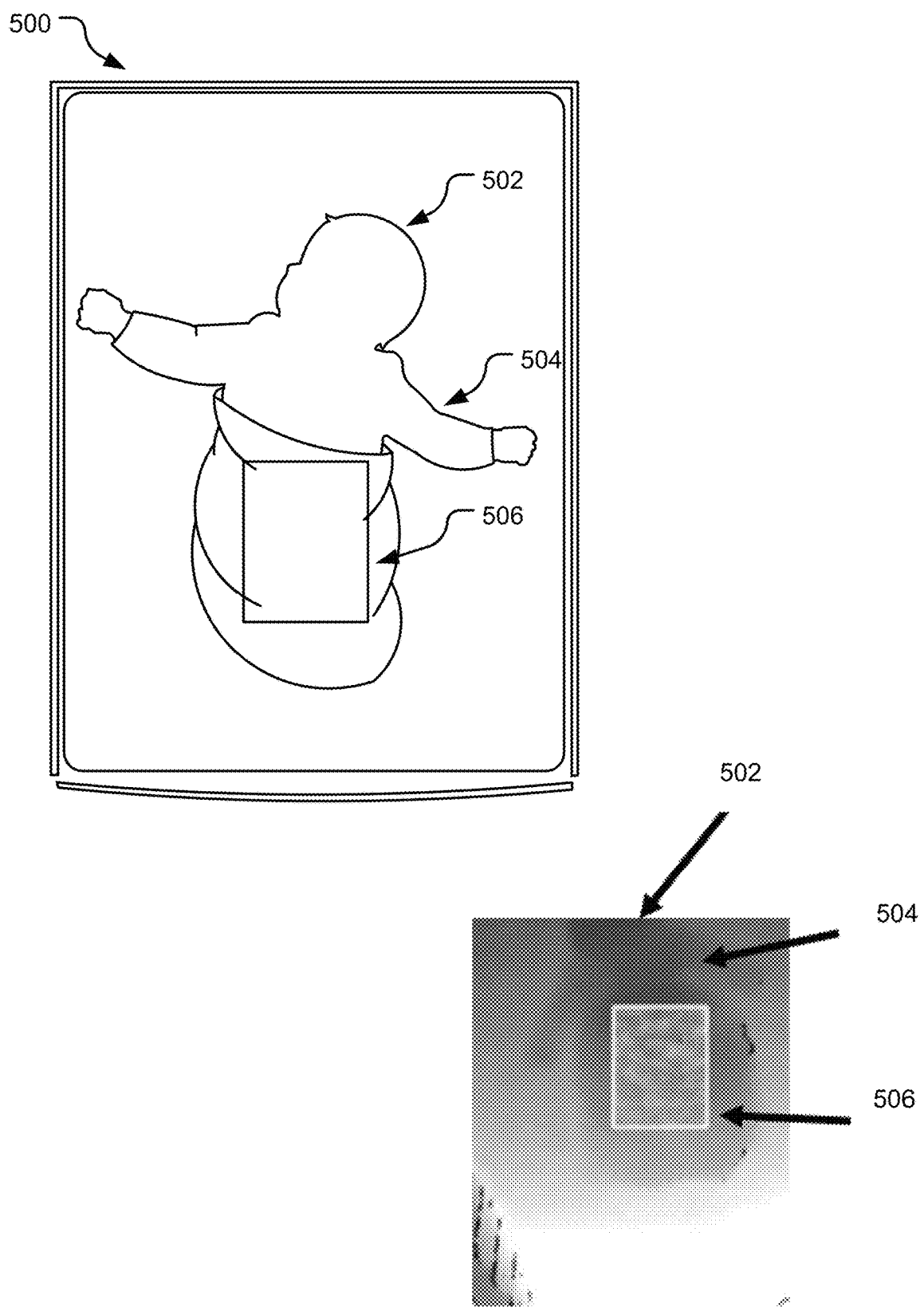
FIG. 5 illustrates an example image of a neonate patient generated by a depth camera video stream.

FIG. 5 illustrates an image of a neonate patient 502 generated by a depth camera video stream. The patient 502 is illustrated as wearing a sleep suit 504 and is shown wrapped in a blanket 506. In one implementation, machine learning is applied to the depth images to identify the baby suit 504 and the blanket 506. If there is any interaction by a caregiver or other person with the patient 502, such interaction may cause interference of various physiological signals generate based on the depth images and trigger an alarm.

Figure 6:
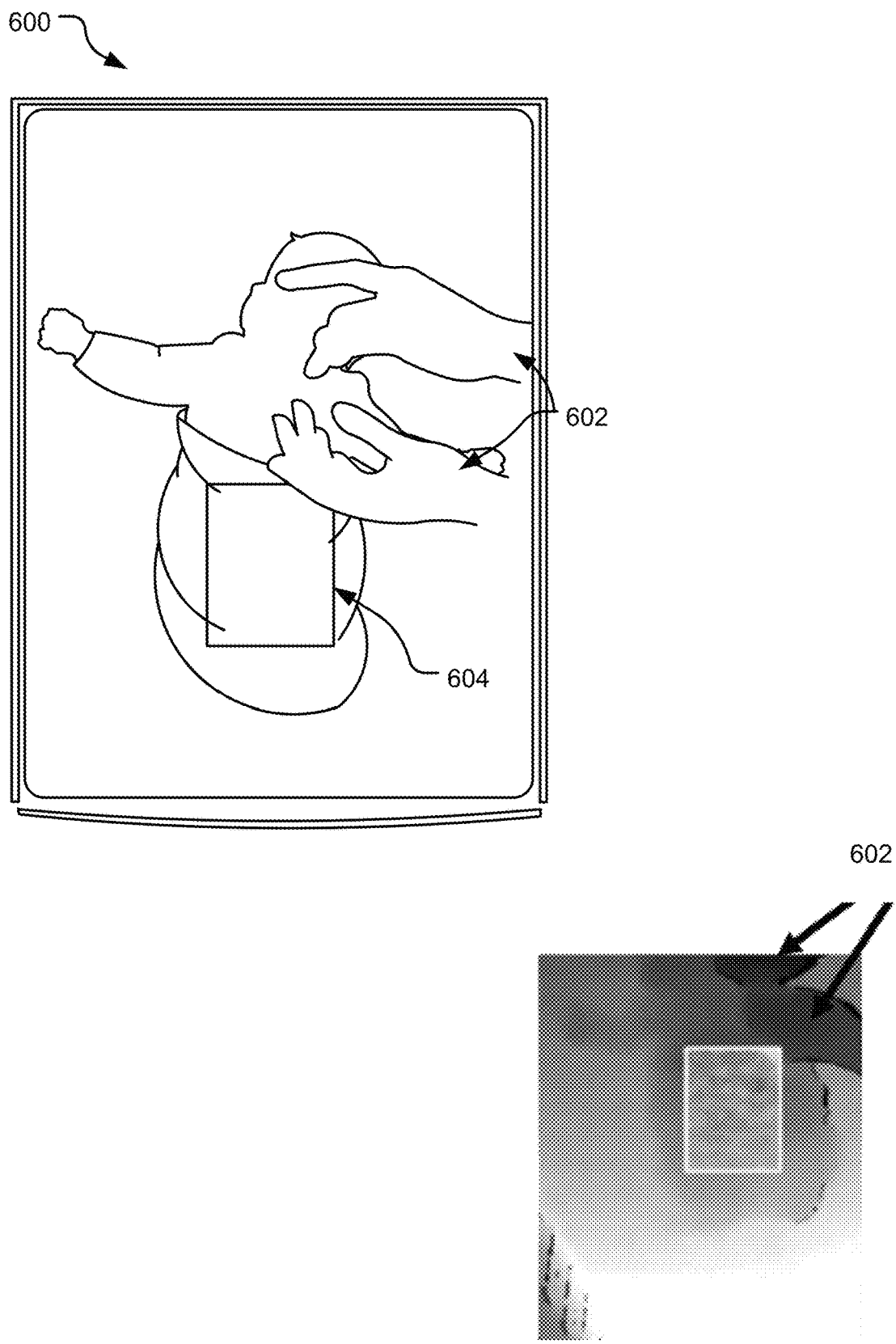
FIG. 6 illustrates an example of a caregiver's hands adjusting a patient's clothing generated by a depth camera video stream.

For example, FIG. 6 illustrates a caregiver's hands 602 adjusting a patient's clothing. When the depth images that includes the caregiver's hands 602 is used to generate any physiological signals, such as patient's heart rate, these physiological signals may result in generation of an alarm. In an implementation disclosed herein, machine learning methods may be used to identify presence of the caregiver's hands 602 in the video images.

Figure 7:
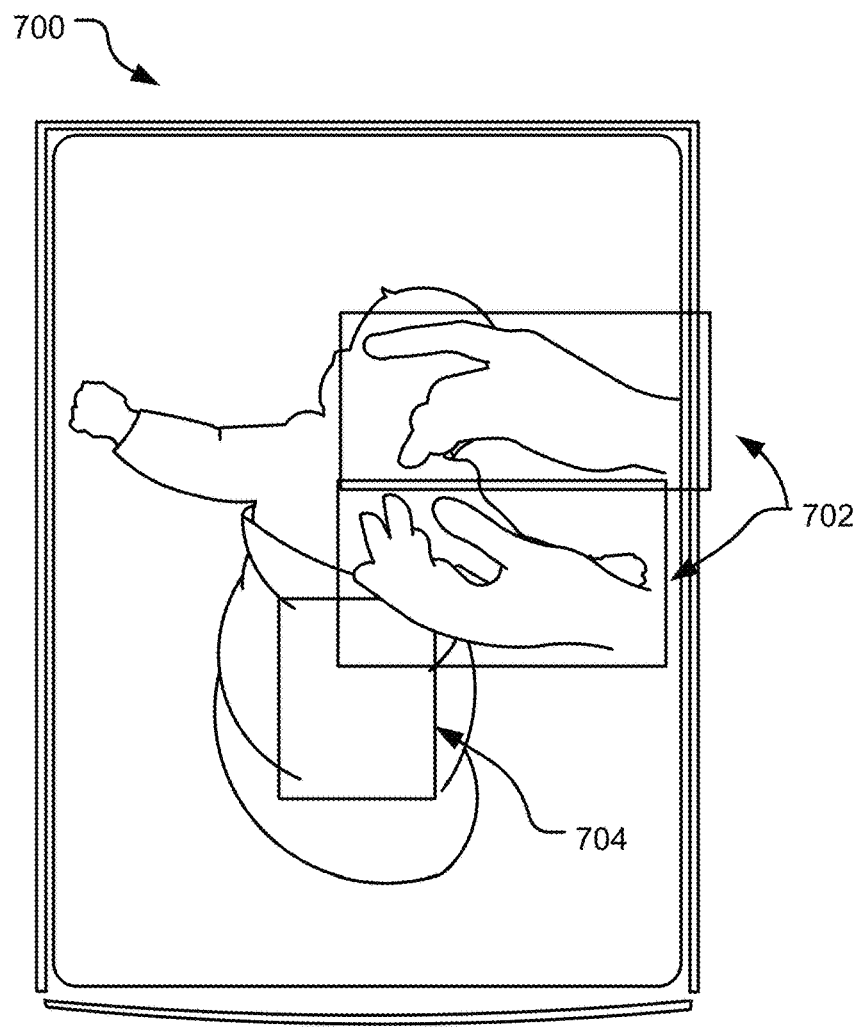
FIG. 7 illustrates example of detection of hands in an image using a machine learning method generated by a depth camera video stream.
Figure 7:
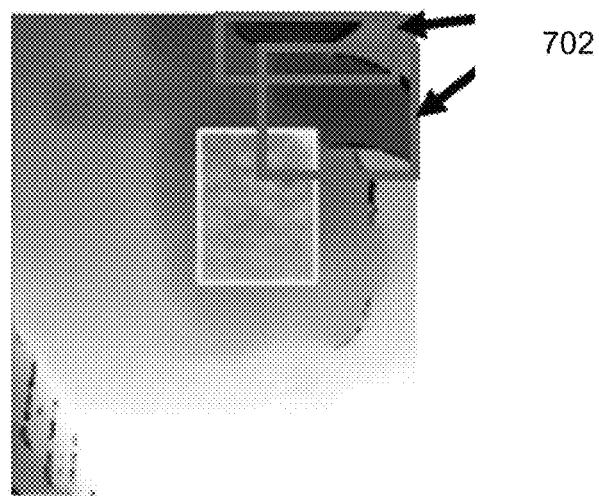

FIG. 7 illustrates detection of hands 702 in an image 700 using a machine learning method. A machine learning module, such as the machine learning module 132 disclosed in FIG. 1, places detection boxes 704 around the hands 702 to indicate their detection.

Figure 8:
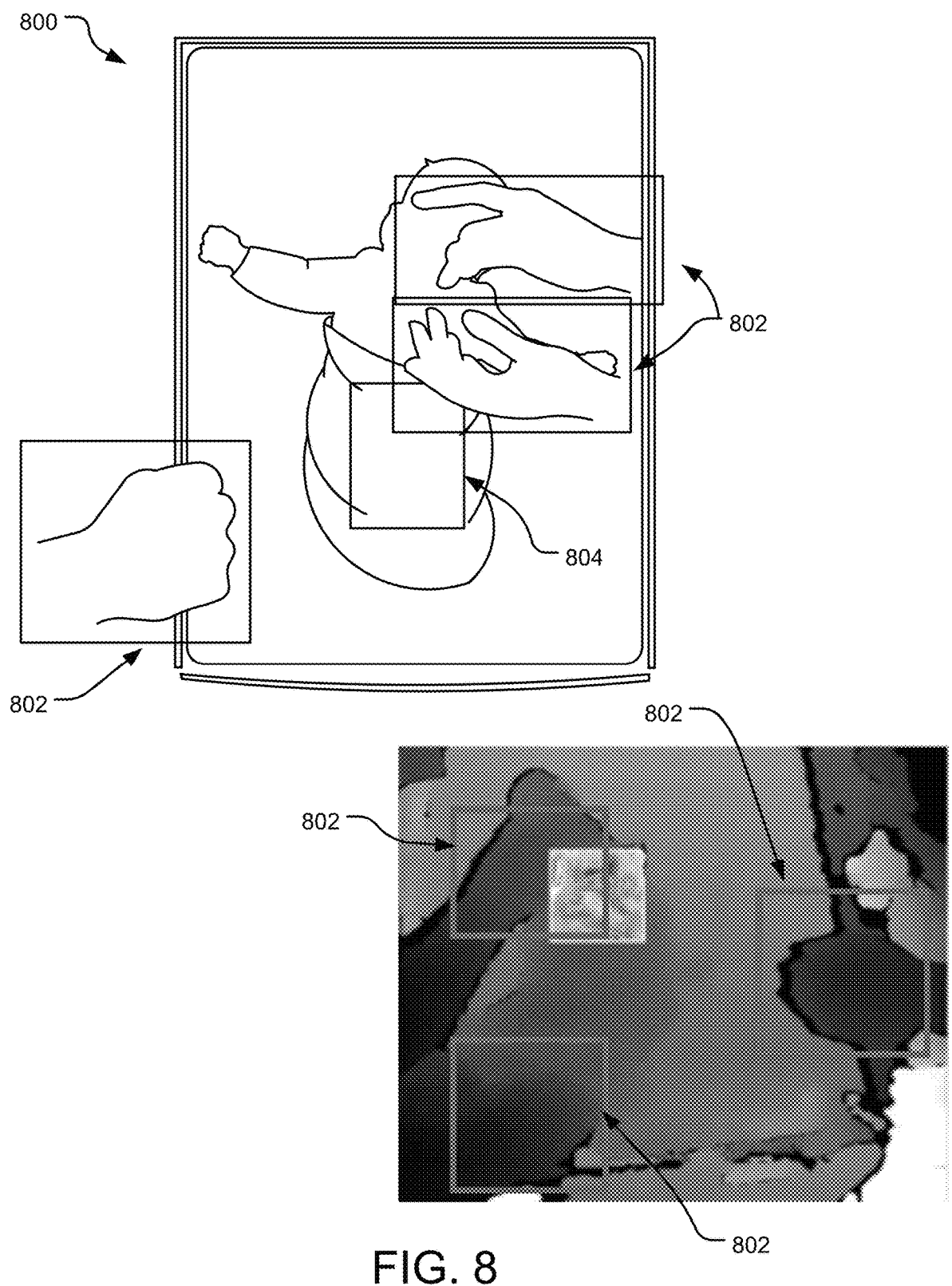
FIG. 8 illustrates three hands being detected around a patient as more than one caregiver interacts with the patient.

FIG. 8 illustrates three hands 802 being detected around a neonatal patient as more than one caregiver interacts with the patient.

Figure 9:
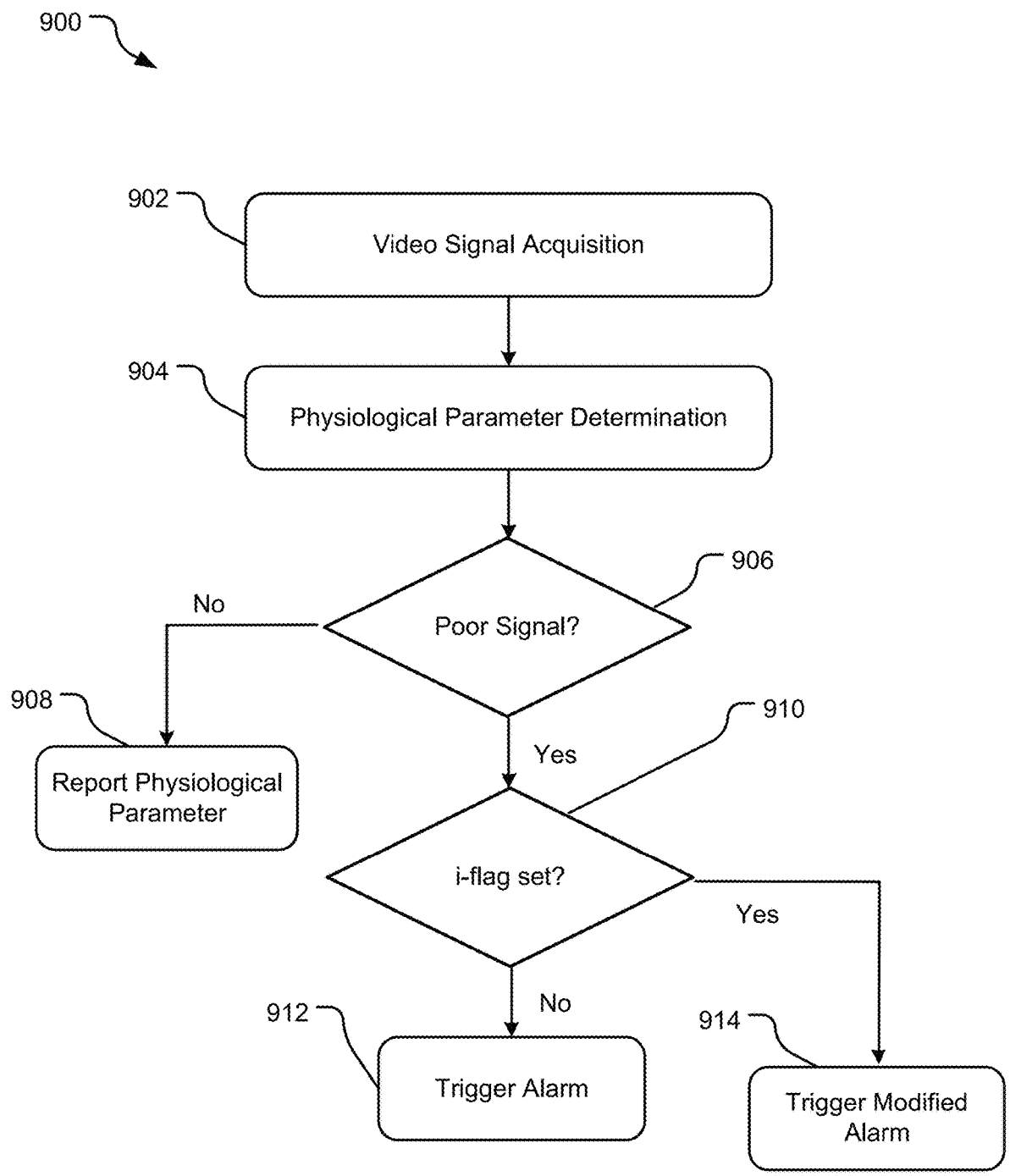
FIG. 9 illustrates example operations for implementing the AI based tagging for alarm management.

FIG. 9 illustrates operations 900 for implementing the AI based tagging for alarm management. An operation 902 acquires video signal from a camera. The video signal may be an RGB stream or a stream of depth images. An operation 904 analyzes the video signal to generate various physiological parameters. For example, the physiological parameters that are generated based on an RGB video stream may be patient heart rate, patient respiration rate, patient SpO2, etc. On the other hand, the physiological parameters that are generated based on an depth video stream may be patient respiration rate, patient tidal volume, patient minute volume, etc.

An operation 906 determines if the quality of the video signal received from the video camera is above a predetermined threshold quality level. For example, the operation 906 may measure the amount of noise in the video signal and compare the measured noise level with a threshold noise level. For example, a level of total movement in the frame may be used as a measure of quality. Alternatively, for RGB stream, some measure of the brightness may be used as a measure of quality. For example, if a frame is too bright or too dark, it may indicate low quality level. If the signal quality is above the threshold quality level, an operation 908 reports the determined physiological parameters to clinicians, displays, or other systems that may use such physiological parameters for patient care.

If the signal quality is below the threshold quality level, an operation 910 determines if an i-flag, indicating an interaction with the patient or an interference in the video stream, has been set. For example, such an i-flag may be set as a result of a machine learning analysis of the video signal that indicates that a caregiver hand near the patient generated the interference in the video signal. If the value of the i-flag indicates that the i-flag is not set, an operation 912 sounds an alarm.

On the other hand, if the value of the i-flag indicates that the poor signal quality was a result of caregiver interference, an operation 914 modifies an alarm signal. For example, the alarm priority may be lowered, or the alarm may be delayed for a predetermined amount of time. Alternatively, in such a case where the i-flag is determined to be set, no alarm may be triggered at all. In an alternative implementation, a caregiver is instructed to look at the video image to see that there is interaction with the patient.

In alternative implementations, when interventions are detected, such interventions may be added to the signal traces on the device that are presented to clinicians. For example, if a caregiver's interaction with the patient during a time period results in the signal trace of the patient's respiratory signal for that time period being of poor quality, an indication of such interaction by the caregiver may be added to the respiratory signal trace displayed to the clinician. This may allow clinicians to correlate their interventions with trends in physiological signals.

While the implementation disclosed in FIG. 9 contemplates the operation 904 to determine the physiological parameters from analysis of the video signal, in alternative implementations, determination of the physiological parameters may be carried out by other devices, such as a pulse oximeter, an electrocardiogram (ECG) generator, etc. In such implementations, the video signal may still be used to determine if there is a clinician or caregiver interaction and to set the i-flag and the i-flag may be used to modify an alarm based on the physiological parameter generated by such an alternative device.

In yet another implementation, once the presence of a caregiver's hand has been detected by the analysis of the video stream, it may be tracked. For example, the velocity at which the caregiver's hand moves across the image of the patient is determined and it is compared to a range of velocities that are consistent with potential physical movements of a caregiver's hand. If the velocity is too high or too low, the system may reject the recognition of a hand. For example, the velocity may indicate a movement that is too fast, discontinuous across the image and/or completely still over a relatively long period of time. Yet alternatively, other body parts of caregivers such as face, elbow, arm, upper torso, etc., may be recognized and used to modify alarms. In one implementation, the body parts of a specific caregiver may be recognized. For example, if hands or faces of specific caregivers are recognized, the alarm is switched off. On the other hand, if hands or faces of specific caregivers are not recognized, the alarm level may be increased.

Figure 10:
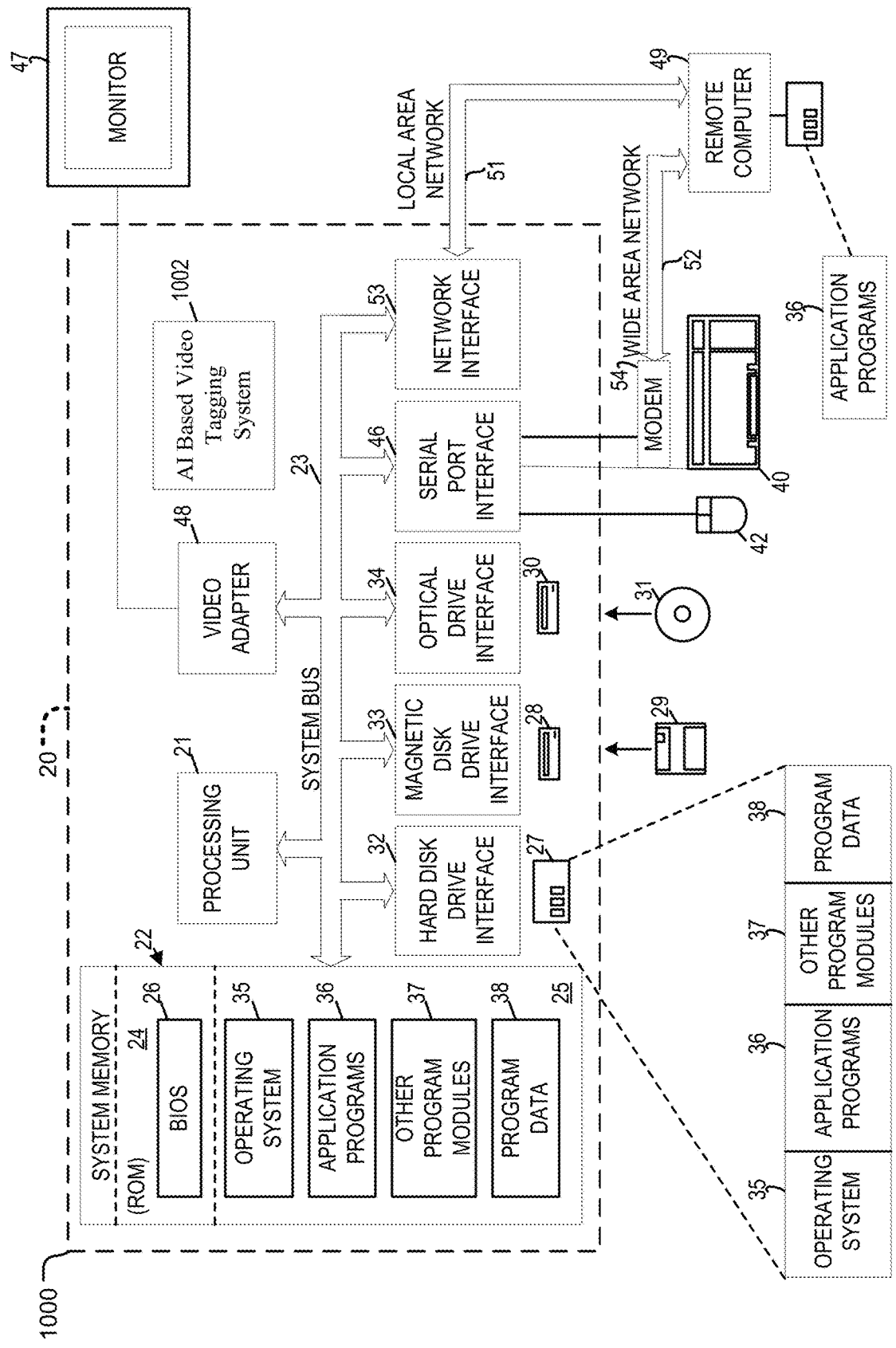
FIG. 10 illustrates an example computing system that may be useful in implementing the described technology.

FIG. 10 illustrates an example system 1000 that may be useful in implementing the described technology for providing attestable and destructible device identity. The example hardware and operating environment of FIG. 10 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 10, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random-access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB) (not shown). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 11 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for providing attestable and destructible device identity may be stored in memory 22 and/or storage devices 29 or 31 and processed by the processing unit 21. One or more datastores disclosed herein may be stored in memory 22 and/or storage devices 29 or 31 as persistent datastores. For example, an AI based video tagging system 1002 may be implemented on the computer 20 (alternatively, the AI based video tagging system 1002 may be implemented on a server or in a cloud environment). The AI based video tagging system 1002 may utilize one of more of the processing unit 21, the memory 22, the system bus 23, and other components of the personal computer 20.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A method, comprising:
   receiving, using a processor, a video stream, the video stream comprising a sequence of images for at least a portion of a patient;
   determining a physiological parameter for the patient;
   detecting, using machine learning, presence of a noise object and setting a interaction-flag to a positive value in response to detecting the noise object;
   comparing a quality level of the sequence of images with a threshold quality level; and
   modifying an alarm level based on the value of the interaction-flag and comparison of the quality level of the sequence of depth images with the threshold quality level.

2. The method of claim 1, wherein the video stream further comprising at least one of a sequence of depth images and a sequence of RGB images.

3. The method of claim 1, determining the physiological parameter for the patient further comprising determining the physiological parameter for the patient based on the sequence of images.

4. The method of claim 1, wherein detecting presence of a noise object further comprising detecting presence of a clinician intervention and setting the interaction-flag to a positive value in response to detecting the presence of a clinician intervention for a predetermined cool-off period.

5. The method of claim 1, wherein detecting presence of a noise object further comprising detecting a velocity of the noise object relative to the patient.

6. The method of claim 5, further comprising:
   comparing the velocity of the noise object to a range of velocities that are consistent with physical movement of an arm to determine presence of a caregiver's hand.

7. The method of claim 1, wherein modifying the alarm level further comprising delaying the alarm level in response to determining that the noise object is a caregiver's hand.

8. The method of claim 1, wherein detecting presence of a noise object further comprising adding a bounding box around an object in one or more of the sequence of images.

9. The method of claim 8, further comprising identifying the object in the bounding box using a multi-object classifier.

10. The method of claim 1, further comprising reporting the physiological parameter to a clinician if the quality level of the sequence of images is above the threshold quality level.

11. In a computing environment, a method performed at least in part on at least one processor, the method comprising:
    receiving, using the processor, a video stream, the video stream comprising a sequence of images for at least a portion of a patient;
    determining a physiological parameter for the patient based on the sequence of images;
    detecting, using machine learning, presence of a noise object and setting a interaction-flag to a positive value in response to detecting the noise object;
    comparing a quality level of the sequence of images with a threshold quality level;
    reporting the physiological parameter to a clinician if the quality level of the sequence of images is above the threshold quality level; and
    modifying an alarm level based on the value of the interaction-flag and comparison of the quality level of the sequence of depth images with the threshold quality level.

12. The method of claim 11, wherein the video stream further comprising a sequence of depth images.

13. The method of claim 11, wherein the video stream further comprising a sequence of RGB images.

14. The method of claim 11, wherein detecting presence of a noise object further comprising detecting presence of a clinician intervention and setting the interaction-flag to a positive value in response to detecting the presence of a clinician intervention for a predetermined cool-off period.

15. The method of claim 11, wherein detecting presence of a noise object further comprising detecting a velocity of the noise object relative to the patient.

16. The method of claim 15, further comprising comparing the velocity of the noise object to a range of velocities that are consistent with physical movement of an arm to determine presence of a caregiver's hand.

17. The method of claim 11, wherein detecting presence of a noise object further comprising adding a bounding box around an object in one or more of the sequence of images and wherein the method further comprising identifying the object in the bounding box using a multi-object classifier.

18. A physical article of manufacture including one or more tangible computer-readable storage media, encoding computer-executable instructions for executing on a computer system a computer process to provide an automated connection to a collaboration event for a computing device, the computer process comprising:
    receiving a video stream, the video stream comprising a sequence of images for at least a portion of a patient;
    determining a physiological parameter for the patient based on the sequence of images;
    detecting, using machine learning, presence of a noise object and setting a interaction-flag to a positive value in response to detecting the noise object;
    comparing a quality level of the sequence of images with a threshold quality level;
    reporting the physiological parameter to a clinician if the quality level of the sequence of images is above the threshold quality level; and
    modifying an alarm level based on the value of the interaction-flag and comparison of the quality level of the sequence of depth images with the threshold quality level.

19. The physical article of manufacture of claim 18, wherein the video stream further comprising at least one of a sequence of depth images and a sequence of RGB images.

20. The physical article of manufacture of claim 18, wherein the computer process further comprising detecting a velocity of the noise object relative to the patient and comparing the velocity of the noise object to a range of velocities that are consistent with physical movement of an arm to determine presence of a caregiver's hand.

* * * * *